March 30, 1926.

W. FRASER

BRAKE

Filed August 25, 1925

1,579,100

WITNESSES
H. T. Walker
S. W. Roster

INVENTOR
William Fraser
BY Munn & Co.
ATTORNEYS

Patented Mar. 30, 1926.

1,579,100

UNITED STATES PATENT OFFICE.

WILLIAM FRASER, OF DOBBS FERRY, NEW YORK.

BRAKE.

Application filed August 25, 1925. Serial No. 52,423.

*To all whom it may concern:*

Be it known that I, WILLIAM FRASER, a citizen of the United States, and a resident of Dobbs Ferry, in the county of Westchester and State of New York, have invented a new and Improved Brake, of which the following is a full, clear, and exact description.

This invention relates to brakes, an object of the invention being to provide an improved brake which is especially designed for use on automobiles or other vehicles, engines and machinery, and which utilizes brake shoes upon a brake drum instead of the ordinary brake band.

A further object is to provide an improved construction of brake which can replace an ordinary brake band and which will utilize brake shoes having novel mounting and operating means whereby a maximum of braking action is had upon the drum.

With these and other objects in view, the invention consists in certain novel features of construction and combinations and arrangements of parts, which will be more fully hereinafter described and pointed out in the claims.

In the accompanying drawings—

Figure 1:
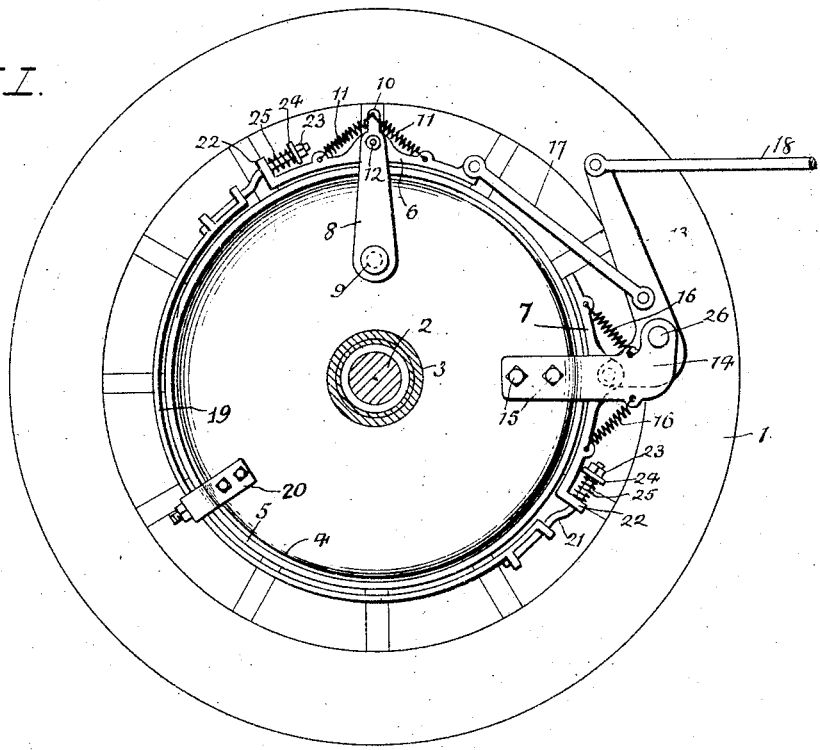
Figure 1 is a view, partly in section but mainly in elevation, illustrating one form of my improved brake.

1 represents a wheel fixed to an axle 2, the latter mounted to turn in a housing 3. 4 represents a brake drum housing and 5 a brake drum, the latter being fixed to turn with the wheel 1, and the drum housing fixed to turn with the axle housing 3, which is the ordinary construction in general use on automobiles.

In lieu of the ordinary brake band I provide a pair of brake shoes 6 and 7, adapted to engage the drum 5 and mounted in an improved manner, as will be now described. The brake shoe 6 is pivotally connected intermediate of its ends to an arm 8, the latter being pivotally connected as shown at 9, to the brake housing 4.

This arm 8 has a finger 10 at its free end and coil springs 11 connect this finger with the brake shoe 6 at opposite sides of the pivotal connection 12 between the shoe and the arm 6. These pivotal connections 9 and 12 permit the shoe to move and be drawn inwardly toward the brake drum 5, the springs 11 serving to permit of the desired or necessary pivotal movement of the shoe to insure the proper engagement of the full braking surface of the shoe with the drum.

The other shoe 7 above referred to is pivotally connected to the shoulder member of a bell crank lever 13, the latter pivotally supported on a bracket arm 14, said arm being secured to the brake housing 4 by bolts or screws 15.

Coil springs 16, corresponding to the springs 11 connect the bracket arm 14 with the shoe 7 and function as set forth in connection with the springs 11. A link 17 pivotally connects one end of shoe 6 with the longer member of the bell crank lever 13 so that when said bell crank lever is caused to move on its pivot by means of an operating rod 18, both shoes will be moved simultaneously.

To hold the shoes normally spaced from the band I provide a strap 19 which is connected intermediate its ends to a bracket 20, the latter secured to the housing 4. This strap 19 at its ends carries rods 21 which project through perforated lugs 22 on the extremities of the shoes 6 and 7, respectively. Nuts 23 are screwed onto the ends of the rods 21 and have washers 24 adjacent the nuts with coil springs 25 on the rods 21 between the lugs 22 and the washers 24 so as to exert a certain amount of spring pressure on the shoes, holding them in normal position and tending to return them to normal position out of engagement with the brake drum.

The operation is as follows:

When the rod 18 is moved to the right of Figure 1, the lever 13 is swung on its pivot indicated by the reference numeral 26, which causes the shoes 6 and 7 to be moved toward each other and also inwardly and engage the brake band 5 with the desired pressure so as to offer any desired resistance to the turning movement of the wheel. When pressure is relieved on the rod 18, the shoes are returned to their forward positions by the action of the springs 25 and also by the action of the springs 16 and 11.

Figure 2:
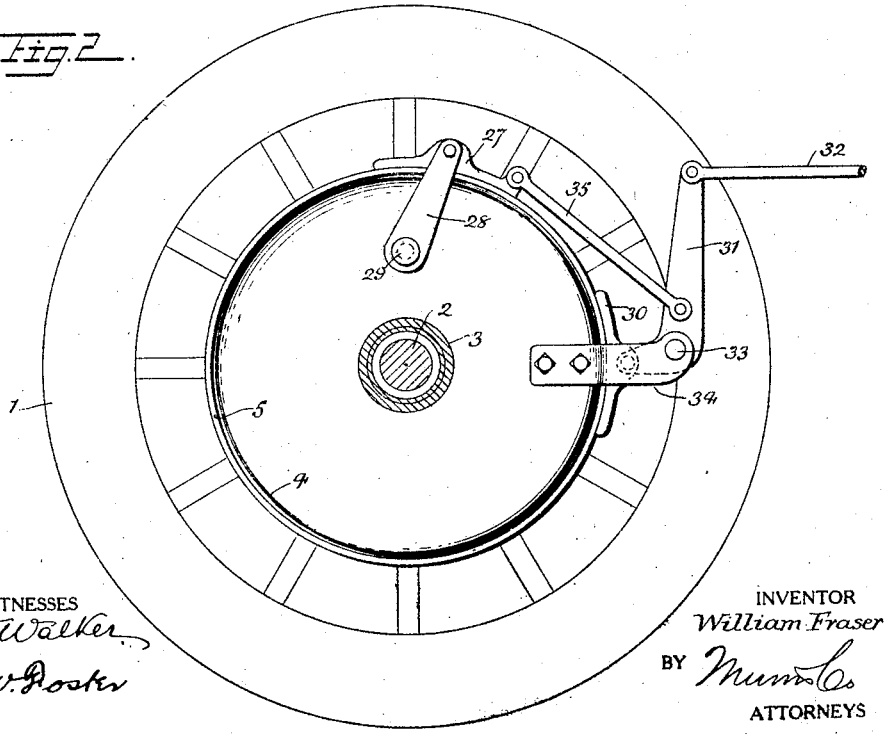
Figure 2 is a similar view illustrating a modification.

In the modification illustrated in Figure 2, I dispense with the arrangement of springs above referred to and provide a shoe 27 pivotally connected to an arm 28, which latter is pivotally connected, as shown at 29, to the brake drum housing 4. Another shoe 30 is pivotally connected to a bell crank lever 31 similar to the bell crank lever 13 and operated by a rod 32. The lever 31 is pivotally connected as shown at 33 with a bracket arm 34 secured to the brake housing 4, and a link 35 connects the shoe 27 with the longer arm of the lever 31.

Figure 2 illustrates the shoes in engagement with the brake drum 5. In other words, the shoes are shown in their braking position, and when the rod 32 is moved to the left of Figure 2 the shoes 27 and 30 will be moved away from the drum 5, as will be readily understood.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. In combination with a brake drum and brake housing, a pair of brake shoes, an arm pivotally connecting one of said brake shoes to the brake housing, a bell crank lever pivotally connected to the brake housing and having its shorter end pivotally connected to the other of said brake shoes, and a link connecting the longer arm of said bell crank lever with the first-mentioned brake shoe.

2. In combination with a brake drum and brake housing, a pair of brake shoes, an arm pivotally connecting one of said brake shoes to the brake housing, a bell crank lever pivotally connected to the brake housing and having its shorter end pivotally connected to the other of said brake shoes, a link connecting the longer arm of said bell crank lever with the first mentioned brake shoe, and springs operatively connecting the respective ends of said brake shoes with a member independent of the shoes and intermediate thereof.

3. In combination with a brake drum and brake housing, a pair of brake shoes, an arm pivotally connecting one of said brake shoes to the brake housing, a bell crank lever pivotally connected to the brake housing and having its shorter end pivotally connected to the other of said brake shoes, a link connecting the longer arm of said bell crank lever with the first mentioned brake shoe, a strap fixed between its ends to the brake drum housing, rods on the ends of the strap, perforated lugs on the shoes receiving the rods, nuts on the ends of the rods, and springs on the rods interposed between the nuts and the lugs.

WILLIAM FRASER.